United States Patent [19]
Siebol et al.

[11] 3,739,682
[45] June 19, 1973

[54] SELF DRILLING, REAMING AND TAPPING SCREW

[75] Inventors: George Siebol, Orange; Robert F. Kolec, Wittier, both of Calif.

[73] Assignee: Olympic Fastening Systems, Inc., Downey, Calif.

[22] Filed: Feb. 25, 1971

[21] Appl. No.: 118,693

Related U.S. Application Data

[63] Continuation-in-part of Ser. No. 815,825, April 14, 1969, Pat. No. 3,578,768.

[52] U.S. Cl. .................................. 85/41, 408/224
[51] Int. Cl. ............................................. F16b 25/00
[58] Field of Search .......................... 85/41, 47, 43; 10/152; 408/223, 224, 225

[56] References Cited
UNITED STATES PATENTS

| | | | |
|---|---|---|---|
| 188,405 | 3/1877 | Peterson et al. | 408/224 |
| 684,774 | 10/1901 | Baggs | 85/41 |
| 1,387,994 | 8/1921 | Lewis | 408/224 |
| 1,643,679 | 9/1927 | Roderick | 408/225 |
| 2,369,120 | 2/1945 | Ferries | 408/224 |
| 3,094,894 | 6/1963 | Broberg | 85/47 |
| 3,358,548 | 12/1967 | Dyslin | 85/47 |
| 3,578,762 | 5/1971 | Siebol et al. | 85/41 |

FOREIGN PATENTS OR APPLICATIONS

| | | | |
|---|---|---|---|
| 1,041,324 | 10/1958 | Germany | 408/224 |

*Primary Examiner*—Marion Parsons, Jr.
*Attorney*—John W. Melville, Albert E. Strasser and Stanley H. Foster et al.

[57] ABSTRACT

A fastener comprising a screw having a head adapted to be engaged by means whereby it may be rotated so as to force it into a workpiece or the like at one end and a workpiece engaging point at the other end. This fastener is designed to have the maximum tensile strength in the total fastener. To this end the shank of the screw, between the point and head, is formed into three sections. The first section, moving from the point towards the head, is of relatively small diameter and is provided with a pair of cutting edges having flutes extending therefrom whereby this section functions as a pilot drill. The next or intermediate section is of larger diameter. The aforementioned grooves or flutes may extend into this section and define a second pair of cutting edges. This intermediate section is provided with its own cutting edges and flutes whereby this intermediate section constitutes a reaming section having multiple cutting edges with flutes extending therefrom. These drilling and reaming sections are designed to give a positive round hole of the proper diameter so that the threaded section can engage the sides of the hole and distort the sheet metal enough so that a firm fastening is accomplished. The third section, therefore, that immediately adjacent the head, is provided with self tapping screw threads of substantially constant diameter and uninterrupted by any grooves, flutes or the like.

1 Claim, 6 Drawing Figures

Patented June 19, 1973
3,739,682
2 Sheets-Sheet 1
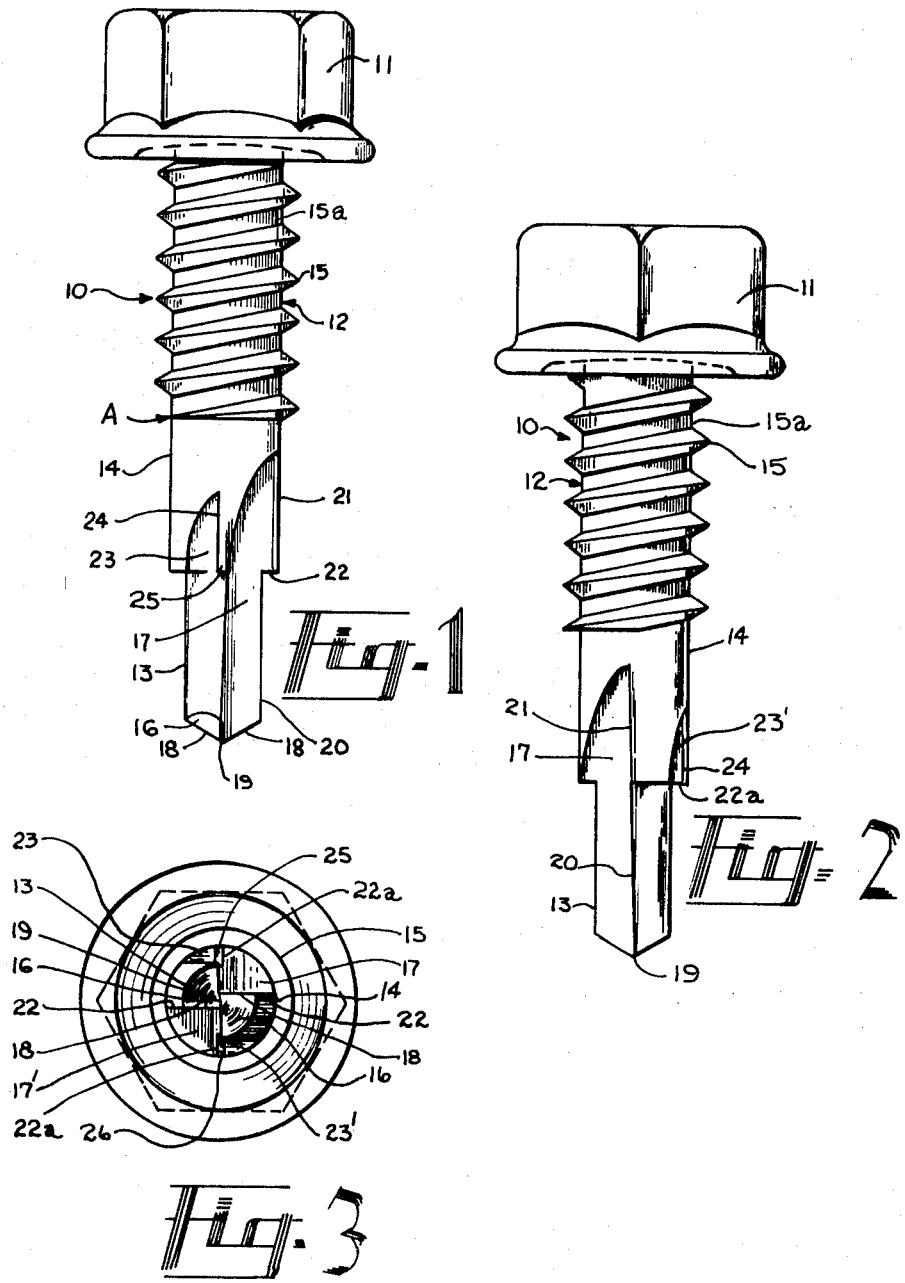
INVENTOR/S
GEORGE SIEBOL
ROBERT F. KOLEC
BY Melville, Strasser, Foster + Hoffman
ATTORNEYS Patented June 19, 1973
3,739,682
2 Sheets-Sheet 2
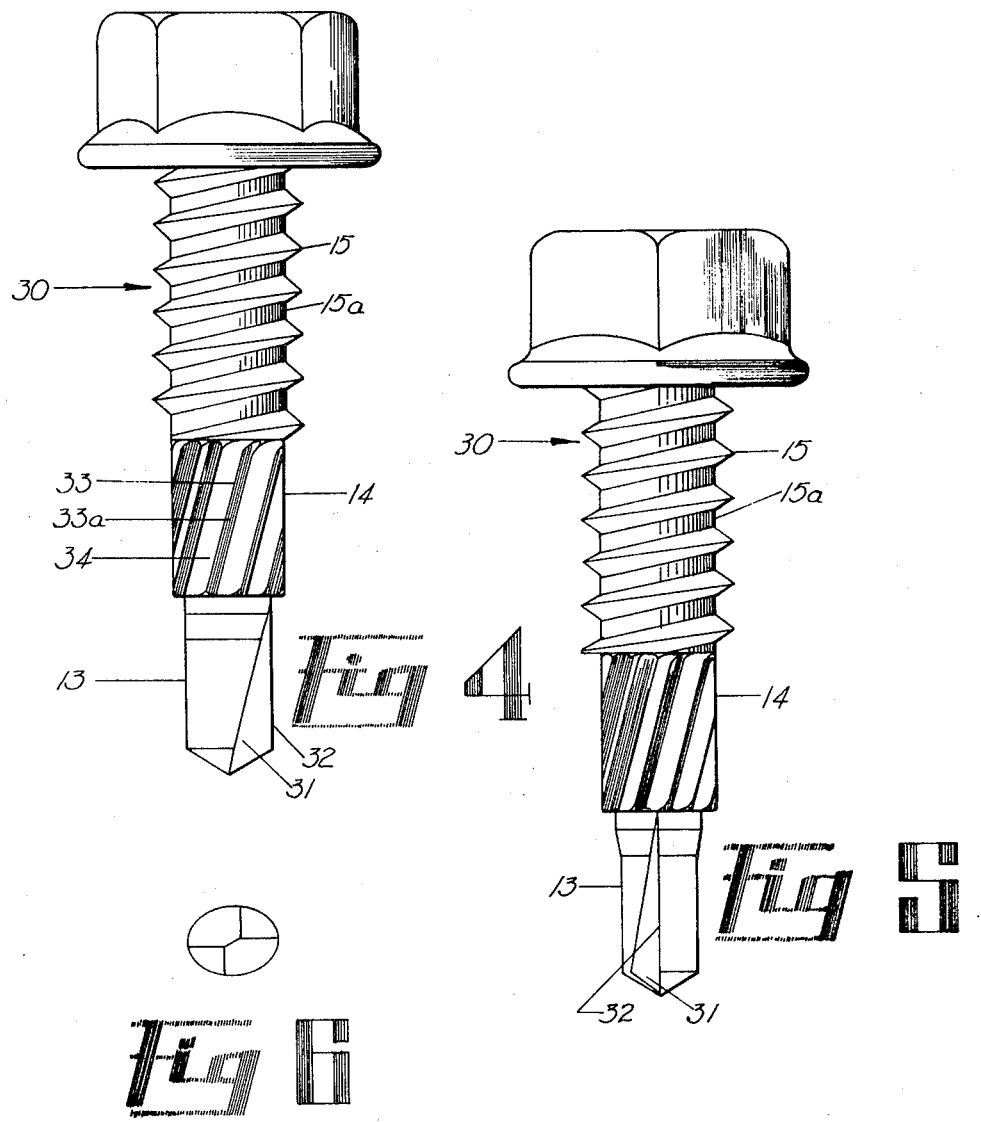
INVENTOR/S
GEORGE SIEBOL
ROBERT F. KOLEC
BY *Melville, Strasser, Foster and Hoffman*
ATTORNEYS

SELF DRILLING, REAMING AND TAPPING SCREW

CROSS REFERENCE TO RELATED APPLICATION

This application is a continuation-in-part application of pending application Ser. No. 815,825 filed Apr. 14, 1969, now U.S. Pat. No. 3,578,768 in the names of the same inventors as those of the instant application and entitled "Self Drilling,Reaming and Tapping Screw."

BACKGROUND OF THE INVENTION

1. Field of the Invention

The screw of this invention has wide application. It has particular application in those fields requiring high quality fastening jobs, such as in the fastening of sheeting panels to structural frame work in metal buildings, wherein it has heretofore usually been the practice to first drill through the workpiece or the like to form a hole which is then reamed out with a multi-flute reamer before the fastener is applied, whereafter it is also tapped, all prior to forcing the screw into its holding position. It is, therefore,especially suited for uses in which the screw must be forced into or through relatively hard materials.

2. Description of the Prior Art

Although a search of the prior patent art has been conducted in order to ascertain the most pertinent of such art, no assertion is made that the best art was indeed located. This, however, was the intent of the search. The following patents appear to be most representative of the art in which this invention relates. U.S. Pat. No. 2,388,482 discloses a surgical screw having a drill portion, a tapping portion having threads interrupted by certain grooves, and a threaded holding section. U.S. Pat. No. 2,479,730 discloses a drill section, a tapered and threaded tapping section, and a holding section. U.S. Pat. Nos. 3,094,895 and 3,125,923 are similar; each includes a drilling section, a tapered and threaded tapping section,a holding section and a plurality of grooves extenting through the drilling and tapping sections into a portion of the holding section. In addition to this art there is that cited by the Examiner during prosecution of said application Ser. No. 815,825, now U.S. Pat. No. 3,578,762.

One of the problems encountered in the prior art is the length of time it takes to set a screw. Another problem has been the lack of adequate holding power once the screw has been set. Both of these problems are solved by the instant invention.

SUMMARY OF THE INVENTION

This invention resides in the provision of a screw having a pointed, pilot drill section of a relatively small diameter and terminating at a multiple fluted reaming section which in turn terminates at the beginning of the threaded section which has constant diameter threads which serve to both tap the work being entered and to hold the screw therein; these threads are uninterrupted by any grooves, flutes or the like and no taper is imparted thereto. In effect, therefore, this fastener or screw encompasses the sequence of a two-drill system in a one piece fastener. The two-drill system enables the speedy formation of a positive round hole of just the right size to receive the desired threads. By eliminating the threaded, tapered entering portion utilized by the prior art, and by doing away with the interruptions imparted to these threads by prior art arrangements, increased holding power of the fastener of this invention is achieved. The pilot drill section makes it easy to make the initial penetration of even very hard materials. Time being of the essence, it is easier and quicker to drill through a small hole and then follow with a reaming action, whereafter the threads are formed, all with the single fastener of this invention.

BRIEF DESCRIPTION OF THE DRAWINGS

Referring now to the drawings,

FIG. 1 is a front elevation of the improved screw in its vertical position, point down, FIG. 2 is a view similar to that of FIG. 1 but in which the screw has been rotated clockwise 90°, FIG. 3 is a bottom plan view of the screw as in the position depicted in FIG. 1, FIG. 4 is a front elevation of a modification of the improved screw in its vertical position, point down, FIG. 5 is a view similar to that of FIG. 4 in which the screw has been rotated clockwise 90°, and FIG. 6 is a partial bottom plan view of the improved screw.

DESCRIPTION OF THE PREFERRED EMBODIMENT

Referring first to FIGS. 1 through 3, the screw of this invention is generally indicated at 10. It is provided with any suitable head 11 by means of which it may be engaged by any one of a number of available tools so that it may be rotatably driven into and through various workpieces and the like. The head shown constitutes a hex but this is exemplary only. Such head may be slotted, or otherwise indented, if desired, to receive the blade of a screw driver and the like. Thus the head 11 may be provided with any convenient, conventional means cooperative with a tool for turning the screw to effect insertion or withdrawal.

The shank which is generally indicated at 12, of the screw 10 comprises a pilot drill 13, a multiple fluted reamer 14 and a threaded section consisting of a plurality of constant diameter threads 15.

The outer end of the pilot drill 13 is provided with a pair of bevels 16 which, in combination with a pair of major grooves or flutes 17, define the two lowermost cutting edges 18 which terminate in a work engaging "point" 19. The major flute corresponding to that indicated at 17 in FIG. 1 is shown at 17' in FIG. 3. In this connection it should be understood that a view taken from the side of the screw directly opposite that shown in FIG. 1 would be identical thereto.

As best seen in FIGS. 1 and 2 the major grooves or flutes 17 extend through the pilot drill 13 and into a substantial portion of the reamer 14. Each flute 17 formed in the cylindrical pilot drill 13 and cylindrical reamer 14 defines a pair of edges 20 and 21 in the pilot drill 13 and reamer 14 respectively. The flute 17 may be formed so as to provide the edges 20 and 21 with any suitable rake angle as may be desired and as is well known in the art. Although a substantially flat, horizontal cutting edge 22 for the reamer section 14 is shown as formed at the juncture of the pilot drill 13 and reamer 14, it may be that a slight angle or bevel having about 20° lead will be employed.

The reamer 14 is also provided with a pair of supplementary grooves or flutes 23 and 23'. These supplementary flutes 23 and 23' define additional edges 24 located solely within the reamer 14. The flutes 23 and any taper from the threads, and by having these threads uninterrupted throughout, a self drilling, reaming and tapping screw is obtained which is quickly installed and with increased holding power.

Having thus described the invention, what is new and what is desired to be protected by United States Letters Patent is:

1. In a fastener comprising a cylindrical shank having at one end a head to be engaged by a fastener driving tool and having at the other end a portion to engage a workpiece and the like; the improvement which comprises providing said shank with three separate sections extending from the workpiece engaging portion to the head, said sections comprising consecutively: a pilot drill of relatively small diameter and having a pair of cutting edges; a reamer of larger diameter and having additional cutting edges, said additional cutting edges being in the form of a plurality of knurls defined by the said flutes of said reamer, the last mentioned flutes being in the form of parallel grooves; and a constant diameter, uninterrupted self-tapping and holding threaded portion, the major diameter of the threads in said threaded portion being greater than the diameter of said reamer and the minor diameter of said threads being no greater than the diameter of said reamer; all of said cutting edges having flutes extending therefrom whereby to define said edges, all of said flutes terminating short of said threaded section.

* * * * *

UNITED STATES PATENT OFFICE
CERTIFICATE OF CORRECTION

Patent No. 3,739,682          Dated June 19, 1973

Inventor(s) GEORGE SIEBOL and ROBERT F. KOLEC

It is certified that error appears in the above-identified patent and that said Letters Patent are hereby corrected as shown below:

On the front, information page of said Patent 3,739,682 under the heading "Related U.S. Application Data", specifically item [63], the notation "Pat. No. 3,578,768" should be "Pat. No. 3,578,762".

Signed and sealed this 27th day of November 1973.

(SEAL)
Attest:

EDWARD M. FLETCHER, JR.
Attesting Officer

RENE D. TEGTMEYER
Acting Commissioner of Patents